(12) United States Patent
Lieberman

(10) Patent No.: US 6,516,349 B1
(45) Date of Patent: Feb. 4, 2003

(54) SYSTEM FOR UPDATING A SET OF INSTANTIATED CONTENT PROVIDERS BASED ON CHANGES IN CONTENT PROVIDER DIRECTORY WITHOUT INTERRUPTION OF A NETWORK INFORMATION SERVICES

(75) Inventor: Noah Lieberman, Boulder, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/391,010

(22) Filed: Sep. 7, 1999

(51) Int. Cl.$^7$ .................. G06F 15/173; G06F 15/16
(52) U.S. Cl. .................. 709/225; 709/229; 709/244
(58) Field of Search .................. 709/238, 239, 709/242, 244, 216, 217, 218, 219, 105, 200, 225, 229; 707/3, 201

(56) References Cited

U.S. PATENT DOCUMENTS

| | | | |
|---|---|---|---|
| 5,848,415 A | 12/1998 | Guck | 707/10 |
| 5,894,554 A | 4/1999 | Lowery et al. | 395/200.33 |
| 5,901,287 A | 5/1999 | Bull et al. | 395/200.48 |
| 6,108,703 A * | 8/2000 | Leighton et al. | 709/105 |
| 6,173,322 B1 * | 1/2001 | Hu | 709/217 |
| 6,185,598 B1 * | 2/2001 | Farber et al. | 709/200 |
| 6,272,536 B1 * | 8/2001 | van Hoff et al. | 707/201 |
| 6,356,899 B1 * | 3/2002 | Chakrabarti et al. | 707/3 |

FOREIGN PATENT DOCUMENTS

EP    0 880 093 A1    11/1998

OTHER PUBLICATIONS

Hasan, M., "Database access for web applications," Active Objects, 1999, 6 pages, http://www.activeobjects.co.uk/database.html.

Hasan, M., "Generating dynamic web content," Active Objects, 1999, 4 pages, http://www.activeobjects.co.uk/generation.html.

"Netscape Communicator Deployment Guide" for Netscape Communicator 4.5, Netscape Communications Corporation, Mountain View, CA, Oct. 12, 1998, XP002185179, 32 pp.

"SmartUpdate Developer's Guide" Netscape documentation, Netscape Communications Corporation, Mar. 11, 1999, XP002155044, 83 pp.

Almeida, S. and Walsh, J., "Gaining Competitive Advantage Through Enterprise Portals," Sun Microsystems, Inc. white paper, Network Strategy Partners, LLC, 1999, 21 pages, http://www.sun.com/software/white–papers/wp–iplanet–nsp/.

(List continued on next page.)

Primary Examiner—Le Hien Luu
(74) Attorney, Agent, or Firm—Zagorin, O'Brien & Graham, LLP

(57) ABSTRACT

A content provider manager has been develop for use in an information services such as a portal or desktop application to provide for "pluggable" content that may be modified simply through changes to the set of content provider components encoded in a repository therefor. Content providers served to clients (e.g., browsers) by an information service are dynamically loaded and instantiated within the execution environment of the information service in correspondence with changes in the repository. In some configurations, a single repository provides a mechanism for additions to, removals from and/or changes in the set of content providing components served by multiple information service installations. Although the techniques described are more generally applicable, they are particularly useful in implementations of dynamic content applications, including user customizable web portal and personalized desktop, e.g., webtop, applications, wherein a suite of content provider interfaces are provided and the content provider interfaces are separately supported, maintained, owned, licensed, etc. or provide content for which a given user or client application may be separately authorized, configured, enabled or licensed.

32 Claims, 5 Drawing Sheets

OTHER PUBLICATIONS

"i–Planet™ Software Architecture," Sun Microsystems, Inc. white paper, Palo Alto, CA, Jun. 1999, 38 pages, http://www.sun.com/software/white–papers/wp–iplanet/.

"Remote Access, No Laptop Required," Sun Microsystems, Inc. cover page, http://www.sun.com/software/cover/, downloaded Jul. 13, 1999, 2 pages.

* cited by examiner

SYSTEM FOR UPDATING A SET OF INSTANTIATED CONTENT PROVIDERS BASED ON CHANGES IN CONTENT PROVIDER DIRECTORY WITHOUT INTERRUPTION OF A NETWORK INFORMATION SERVICES

BACKGROUND OF THE INVENTION

1. Field of the Invention

The invention relates to information services, and more particularly, to systems, methods and articles of manufacture for allowing the set of content provided by an information service to be dynamically modified.

2. Description of the Related Art

The internet has become an important medium for information services and electronic commerce. As the internet was commercialized, organizations initially established their presence in cyberspace by making available relatively static information, including generalized descriptions of products and services. More recently, dynamic content has become popular. For example, electronic commerce sites now typically present product offerings and pricing information that varies over time. Similarly, internet news services offer news related content that is routinely updated. Search engines and portals similarly offer content that is updated over time. Often access is provided to time varying content through a relatively fixed set of interfaces resolved at runtime using technologies such as server side includes (SSI), Common Gateway Interface (CGI) scripts, Java™ Servlets and Java Server Pages (JSP) implementations based on software available from Sun Microsystems, Inc. and Active Server Pages (ASP) implementations based on software available from Microsoft Corporation. Java and all Java-based marks and logos are trademarks or registered trademarks of Sun Microsystems, Inc. in the United States and other countries.

While sophisticated dynamic content has been provided using such technologies, typically the underlying implementation is fixed. In particular, implementing infrastructure, e.g., CGI scripts, servlets, JSP or ASP pages and embedded code, is typically static and dynamic content is provided using static infrastructure to access database content that is itself dynamic. Modifications to the CGI scripts, servlets, JSP or ASP pages and embedded code for accessing databases or other backend services such as credit card validation, search, payment settlement, order processing, etc. typically require code and HTML modifications, recompilation and new code releases. As a result, information services must typically be interrupted for addition, removal or change to a set of content providing components. Systems and methods are desired that allow content provider components to be added, removed or changed without base code recompilation, package installation or information service downtime.

SUMMARY OF THE INVENTION

Accordingly, techniques have been developed to provide dynamic management of content provider components. In particular, systems, methods and articles of manufacture have been developed to allow additions to, removals from and/or changes in the set of content providing components provided by an information service without interruption of the information service. Some configurations in accordance with the present invention, e.g., a content provider manager and desktop service described herein, provide for "pluggable" content that may be modified simply through (1) changes to the set of content provider components encoded in a repository therefor and (2) responsive changes in the set of instantiated content providers served by the configuration. In some configurations, a single repository provides a mechanism for additions to, removals from and/or changes in the set of content providing components served by multiple information service installations.

Although the techniques described herein are more generally applicable, they are particularly useful in implementations of dynamic content applications, including user customizable web portal and personalized desktop, e.g., webtop, applications, wherein a suite of content provider interfaces are provided and the content provider interfaces are separately supported, maintained, owned, licensed, etc. or provide content for which a given user or client application may be separately authorized, configured, enabled or licensed.

In one embodiment in accordance with the present invention, a method of modifying content served by a networked information service includes instantiating a set of one or more content provider classes, supplying a client application with content corresponding to the instantiated content providers, updating the set of instantiated content providers without interruption of the networked information service, and thereafter supplying the client application with content corresponding to the updated set of instantiated content providers. The set of instantiated content providers is based on encoded representations thereof in a content provider directory and the updated set of instantiated content providers is based on changes to content provider directory. In one variation, the updating includes, for each new content provider, instantiating a corresponding new class and adding the corresponding instantiated class to a list of content providers available to the networked information service. The updating further includes, for each removed content provider, destroying a corresponding previously instantiated class and removing the corresponding previously instantiated class from the list of content providers available to the networked information service.

In another embodiment in accordance with the present invention, a method of updating content served by an information resource without interrupting operation of the information resource includes: instantiating in accordance with a content repository, a set of software objects implementing respective content sources; adding to, and removing from, the set of instantiated software objects in correspondence with additions to, and deletions from, the content repository; and, in response to a request from a client application, selecting for execution those of the set of software objects consistent with associated user parameters; executing the selected software objects; and supplying the client application with content sourced from the selected software objects. The instantiated software objects are executable by the information resource without recompilation of the information resource and without a service interrupting restart thereof In one variation, the client application includes a web browser; the information resource includes a web portal and the content supplying includes organizing content from the selected software objects and supplying the organized content to the web browser as a web page.

In yet another embodiment in accordance with the present invention, a method of providing a dynamically variable set of content instances in an information resource environment includes predefining at least one repository for encoding one or more content instances of the set of content instances; instantiating, in response to addition to the set of content instances of an encoding for a first content instance, the first content instance within the information resource environment without interruption thereof; and thereafter, presenting the first content instance as part of the information resource environment. In one variation, the method further includes dissociating, in response to removal from the set of content instances of an encoding for a second content instance, the second content instance from the information resource environment without interruption thereof; and thereafter, presenting the information resource environment without the second content instance. In another variation, the method further includes reinstantiating, in response to modification of an encoding for a third content instance, the third instance within the information resource environment based on the modified encoding; and thereafter, presenting a modified third content instance as part of the information resource environment. The reinstantiating is without interruption of the information resource environment.

In still yet another embodiment in accordance with the present invention, a networked information system includes a content manager service responsive to client requests for access to content providers and means for updating a set of instantiated content providers in correspondence with changes in a repository therefor and without interrupting client request servicing by the content manager. The content manager instantiates the set of the content providers encoded in the repository.

In still yet another embodiment in accordance with the present invention, a computer program product encoded in at least one computer readable medium includes content provider manager code and information service code. The content provider manager code is executable on one or more computers as a content provider manager service to maintain a time-varying set of instantiated content provider objects in correspondence with a content provider repository. The information service code is executable to service incoming requests for information content. The interface code services the incoming requests with information content from the time-varying set of instantiated content provider objects. Changes to the time-varying set of instantiated content provider objects are supported without a service interrupting recompilation or restart of the information service code. In various variations, the information service code implements a web portal or a desktop service.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
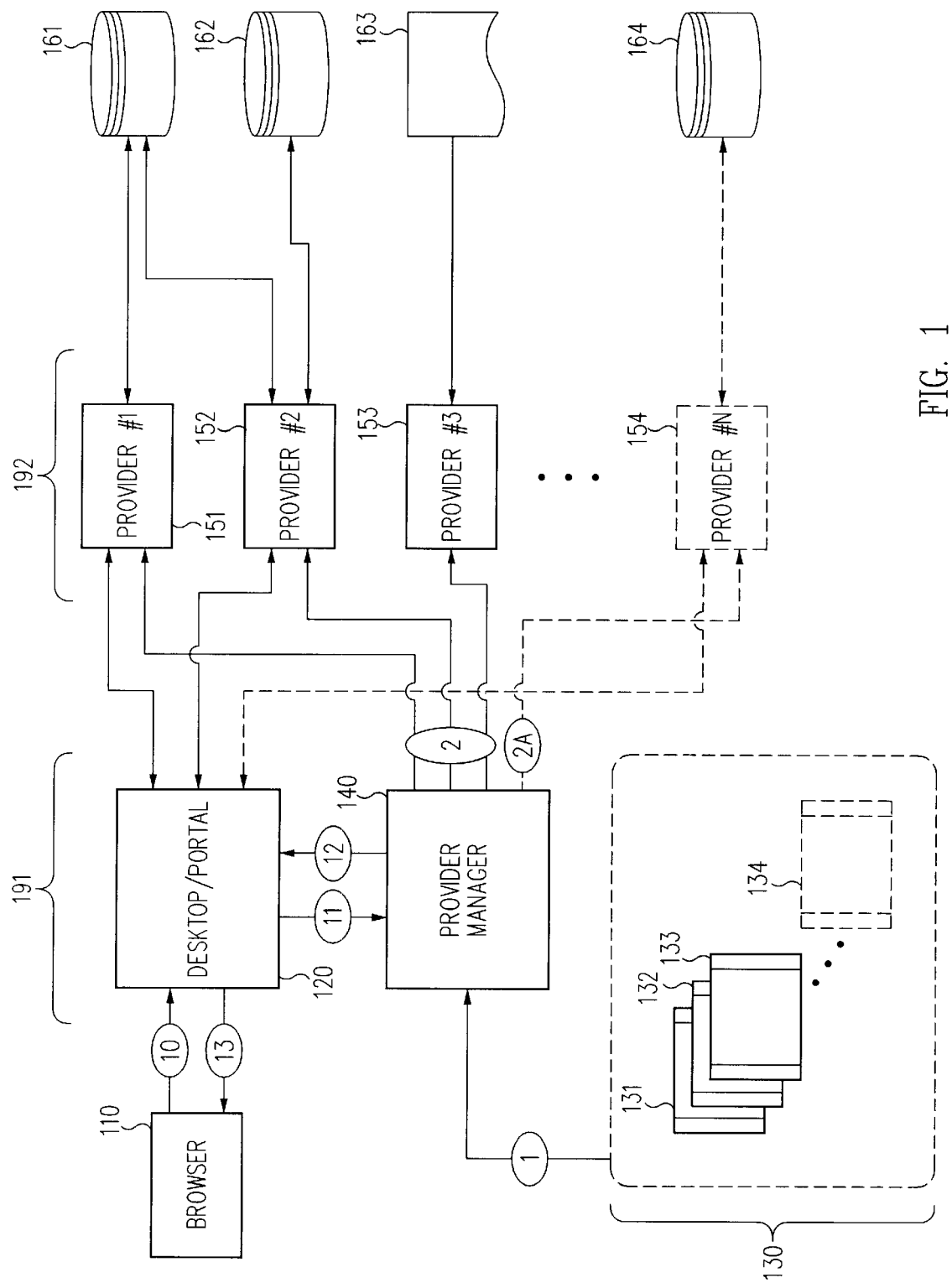
FIG. 1 depicts an exemplary configuration of components providing dynamic management of content in accordance with an embodiment of the present invention.

FIG. 1 illustrates components of an exemplary configuration for dynamically managing a set of content providers. Although not limited thereto, some aspects of the present invention are described herein in the context of content provider types, media content and messaging interfaces typical of web portal applications and browser technologies. Nonetheless, based on the description herein, persons of ordinary skill in the art will appreciate applications to information services, in general, wherein dynamic management of the set of underlying information sources is provided without interruption of the information service.

Focusing then on the illustrative configuration of FIG. 1, content provider manager 140 dynamically loads a set of content providers (e.g., provider 151, provider 152, and provider 153) in correspondence with contents of a content provider repository (e.g., content provider repository 130). Content provider repository 130 encodes representations of a set of available content providers (e.g., as representation 131, representation 132 and representation 133). Initially, content provider manager 140 loads (2) a set of content providers based on the contents of content provider repository 130. Thereafter, the loaded set 192 of components is maintained in accordance with contents of content provider repository 130.

In some configurations, content provider manager 140 periodically checks content provider repository 130 for additions, deletions, or changes to the set of content provider representations encoded therein. Other timings, e.g., event triggered, in response to access requests, etc., may be implemented in other configurations. Upon detection (1) of a change, content provider manager 140 dynamically loads a content provider or content providers in accordance with the change. For example, in the case of an addition to repository 130 (e.g., added content provider representation 134) content provider 140 detects the addition and dynamically loads (2A) content provider 154 in response thereto. In the case of a deletion, content provider manager 140 similarly detects the deletion (e.g., of representation 132) and deallocates a corresponding loaded content provider (e.g., content provider 152) in response thereto. Content provider manager 140 also detects modifications to content provider representations (e.g., to content provider representation 131). In response to a detected modification, content provider manager 140 reloads a corresponding content provider (e.g., content provider 151) in accordance with the updated representation thereof. In this way, content provider manager 140 allows a set (192) of dynamically loaded content providers to be maintained in accordance with a separate repository (e.g., in accordance with the set of content providers for which representations are encoded in content provider repository 130). The set 192 of dynamically loaded content providers therefore reflects additions of new content providers, removal of old, outdated or faulty content providers and updates to existing content providers. Advantageously, configurations in accordance with the present invention allow modifications to the set of available content providers to track software updates and feature enhancements. However, other advantages, such as the ability to modify the set of available content providers based on other criteria such as security posture or load conditions, are also provided.

In one realization, content provider manager 140 and an information service application (e.g., web desktop or portal application 120) are loaded and instantiated within a server environment, e.g., as objects loaded and instantiated from class definitions enumerated in the class path of the server application. Together, these initially loaded objects or components are illustrated as set 191. In contrast, set 192 of content provider objects or components is dynamically loaded and dynamically instantiated. Typically, content provider manager 140 maintains an internal representation or list of currently loaded content providers. For example, in one realization, content provider manager 140 maintains a data structure (e.g., a list or array) of content provider interfaces. By defining a uniform interface to content providers, and by dynamically loading and instantiating implementing classes (e.g., as encoded by a content provider representation such as 131), the set of available content providers may be changed without restarting or interrupting web desktop/portal application 120.

One realization of a uniform content provider interface is as an "interface" that defines the methods a content provider object must support. Classes implementing the interface are defined for each content provider (e.g., in encoded form in content provider repository 130). By way of example and not limitation, one realization of a content provider interface is as follows:

```
public interface SNContentProvider {
    public StringBuffer getHTMLContent( Hashtable userData );
    public StringBuffer getHTMLEditForm( Hashtable userData );
    public StringBuffer getHTMLHelpContent( Hashtable userData );
    public Hashtable processEditForm( HttpServletRequest request, Hashtable userData );
    public Properties getproperties( );
    public String getProperty( String key );
}
``` wherein content provider implementations particular to a given web desktop or portal application each implement the getHTMLContent, getHTMLEditForm, getHTMLHelpContent, processEditForm, getProperties, and getProperty methods. Of course, other realizations may define different interfaces. In the exemplary realization above, a method implementing getHTMLEditForm returns an HTML edit form for modifying content provider properties and/or preferences. The returned HTML edit form is typically supplied by web desktop/portal application 120 to a client application (e.g., a browser) for display to a user, entry of properties and/or preferences by the user, and posting back to web desktop/portal application 120. For example, a method implementing getHTMLEditForm for a stock quote content provider instance may return an HTML edit form allowing a user to select particular ticker symbols for tracking and/or allowing a user to specify a particular presentation of data (e.g., time period and comparable index for rendition on a graph). The processEditForm method allows web desktop/portal application 120 to pass posted form data (e.g., from a browser and user) in the form of an HttpServletRequest to the content provider implementation. Thereafter, web desktop/portal application 120 may employ the getHTMLContent method to obtain content (e.g., encoded as HTML, images, moving picture formats, audio content, scripts, Java programming language code, etc.) from a particular content provider implementation.

As described elsewhere herein, some realizations in accordance with the present invention allow user preferences, identity, permissions and/or roles to affect the set of content providers available, the content available form, or supplied by, a particular content provider instance, the format of content supplied by a particular content provider instance, etc. Accordingly, in the exemplary realization above, userData is passed from web desktop/portal application 120 to various implementing methods of a client provider implementation to facilitate preferences, identity, permission and/or role driven content.

In some configurations in accordance with FIG. 1, content provider repository 130 is implemented as a file system directory accessible to content provider manager 140. In such configurations, individual content provider representations (e.g., representations 131, 132, 133, and 134) may be encoded as files in the corresponding content provider directory (or directories). In one such file system directory-based implementation, content provider manager 140 detects changes to the set of representations simply by using file system facilities indicating the time at which the content provider directory was last changed. In case of a detected change to the contents of the content provider directory, content provider manager 140 then checks the individual representations to determine the set of added, removed and/or updated representations in the repository. Other content provider repository configurations are also envisioned. For example, in configurations providing centralized management of content served by distributed web desktop/portal applications, content provider repository 130 may be implemented as a network accessible resource such as a callable information service, a database system, a remotely accessible file system, etc. In this way, update to a single network accessible content provider repository allows an implementation of a content provider hosted by multiple information services, e.g., a stock portfolio tracker component hosted by information service portals of a variety of licensees, to be added, deleted or upgraded throughout the world without interruption of the information services.

In one exemplary realization, representations of content provider implementations are encoded in content provider repository 130 in compressed form as Java Archive (jar) files. Both implementing class definitions and HTML templates for use by an instantiated content provider are typically included in a jar file representation. In response to a detected addition or change to a jar encoded content provider representation, content provider manager 140 uncompresses contents of the corresponding jar file and loads implementing classes into an execution environment. Other realizations may employ other encodings (e.g., other archive formats, compressed and uncompressed formats, indirect encodings referencing a separate store, etc.) without departing from the spirit and scope of the invention as recited in the appended claims. In some realizations, instantiation of a loaded content provider may be deferred until a request is received from web desktop/portal application 120 for the added or changed content provider. In other realizations, instantiation may be coincident with loading.

Referring again to FIG. 1, as additional content providers are loaded, e.g., in response to changes in the set thereof encoded by content provider repository 130, additional content providers are made available to web desktop/portal application 120 by content provider manager 140. In contrast, existing web portal applications require interruption (typically with code changes and application restart) to change the set content serviced thereby. Deletions handled similarly in an exemplary realization of content provider manager 140 and web desktop/portal application 120. In such implementations, content provider manager 140 may simply update its internal list of content provider interfaces to remove the deleted content provider instance. Modifications to an implementing class are handled by loading the new class definition(s) and updating content provider manager's internal list to identify the newly loaded class. In some realizations, content provider manager 140 may omit deallocation of a removed or replaced content provider. For example, in implementations based on virtual machine environments providing automated memory management (e.g., garbage collection) application directed deallocation may be unnecessary.

In some implementations in accordance with the present invention (e.g., implementations based on object-oriented technologies) content provider manager 140 may dynamically load a corresponding set of content providers without instantiating instances thereof. In other implementations, including other object-oriented implementations, dynamically loaded content providers (e.g., providers 151, 152, 153, and 154) maybe instantiated coincident with loading.

In the embodiment of FIG. 1, dynamically loaded content providers 192 are shown distinct from underlying data stores (e.g., data store 161, data store 162, data store 163, and data store 164). Based on the description herein, persons of ordinary skill in the art will appreciate a wide variety of data stores suitable for interaction with content providers. For example, data stores may include data base management systems, including relational data base management systems, files, callable interfaces to applications, etc. Content providers (e.g., content providers 151, 152, 153, and/or 154) supply information based on data represented in zero or more of such data stores. For example, a given content provider may draw information from multiple data stores to present an integrated presentation thereof. Alternatively, a content provider need not interface with any external data store.

In general, dynamically loaded content providers 192 can include any dynamically loaded software component capable of supplying information content suitable for presentation by an information service (e.g., by web desktop/portal application 120). For example, in a web desktop/portal application, content provided by a particular content provider implementation may include:

(1) directory content such as yellow pages information, employee list information, etc.;

(2) interfaces to search facilities, schedule or temporal content, such as movie listings or conference room scheduling information;

(3) interfaces to applications sets, toolbars, file systems, etc.;

(4) advertising content, banner ads, etc.;

(5) news content, press release information, articles sorted by topic, author, publication, etc.;

(6) interfaces to communications facilities such as for voice messaging; text messaging; audio, visual, or audiovisual broadcast and/or point-to-point media content; etc.; and (7) real-time or near-real-time data presentations, such as of financial, stock price, system status, traffic flow, or manufacturing process control data, etc.;

In general, supplied information content may take a variety of forms, e.g., encoded as HTML, images, moving picture formats, audio content, scripts, Java programming language code, etc. Although in typical configurations, supplied information includes media or multimedia content suitable for presentation to a human user at a browser, other configurations may supply information content suitable for non-human clients, e.g., for automated agents, real-time data applications, etc.

By employing techniques described herein, the information service can be made "content agnostic," i.e., essentially without knowledge of the particular content it serves to clients. By decomposing available content sources into dynamically loadable content providers configuration management can be improved (e.g., addition, deletion and modification of functionality are facilitated), content may be supplied with a higher level of configurability and customization than otherwise typically available, information service implementations will exhibit performance scalable to large sets of content providers, and maintenance is facilitated by allowing replacement content provider components to be installed without regression in other portions of a desktop or portal application.

Focussing now on an illustrative desktop/web portal exploitation of a dynamic content provider configuration in accordance with the present invention, a client application (e.g., browser 110) queries a network application implementing the desktop or web portal 120. For example, browser 110 operating on behalf of a particular user (not shown) may query desktop/web portal 120 for a user customized desktop or portal presentation. Although persons of ordinary skill in the art will appreciate a wide variety of applications based on the description herein, an exemplary exploitation as a web portal is illustrative. Persons of ordinary skill in the art will recognize a wide variety of existing portal applications, including those built around search engine facilities such as MY YAHOO, MY ALTAVISTA, SNAP.com, etc., those built around news organization content such as myCNN.com or MSNBC.com or others such as MY NETSCAPE as illustrative of the type of content that may be presented in using facilities of the present invention. By employing facilities described herein for dynamic management of content providers, customizability, scalability and configuration management of similar portal or desktop applications may be improved. In particular, in some realizations, additions, deletions, and modifications to available sets of content provider components may be performed without interruption of the portal or desktop application.

Referring again to FIG. 1, desktop/portal 120 obtains (11, 12) an encoding or list of currently available content providers from content provider manager 140 in response to a request (10) from browser 110. Based on the list of available content providers, desktop portal 120 obtains content from at least a subset of the available content providers. In some configurations, desktop/portal 120 selects from amongst the available content providers based on user preferences and/or permissions or roles. In some configurations, sophisticated authentication, authorization and permission facilities may be employed to restrict access to particular content providers or to particular data presented thereby. In other implementations, authentication, authorization, permissions, and roles may be unnecessary. User preferences may also define a subset of the available content providers for which a given user will receive integrated content. In such configurations, user preferences may be established within the context of a given session or may be persistent across sessions. Facilities for tracking users across session context (e.g., using cookies or through authentication of a principal ID) will be appreciated by persons of ordinary skill in the art. Based then on any permission, role and/or preferences employed by desktop/portal 120, a subset of available loaded content providers is used to integrate content returned (13) to browser 110.

For implementations in which loading and instantiation are separable, dynamically loaded content providers may be instantiated in response to a request from desktop portal 120 for currently available content providers. In some configurations, a single instance of each available content provider may be instantiated. In such configurations, each instantiated content provider should be "thread-safe" so that transactions from multiple browsers will be handled appropriately. In other implementations, multiple instances of a content provider may be instantiated as appropriate for load balance or corresponding to individual browser sessions. In some configurations, desktop/portal 120, content provider manager 140 and each of the dynamically loadable content providers 192 are implemented within a application or web server environment. For example, each maybe implemented using servlet technology in the context of a Java web server implementation. In such an implementation, desktop/portal 120 and content provider manager 140 may be loaded on application initialization based on contents of class path, whereas the content providers themselves (e.g., content providers 151, 152, 153, and 154) are dynamically loaded by content provider manager 140 in accordance with the contents or state of repository 130.

Figure 2:
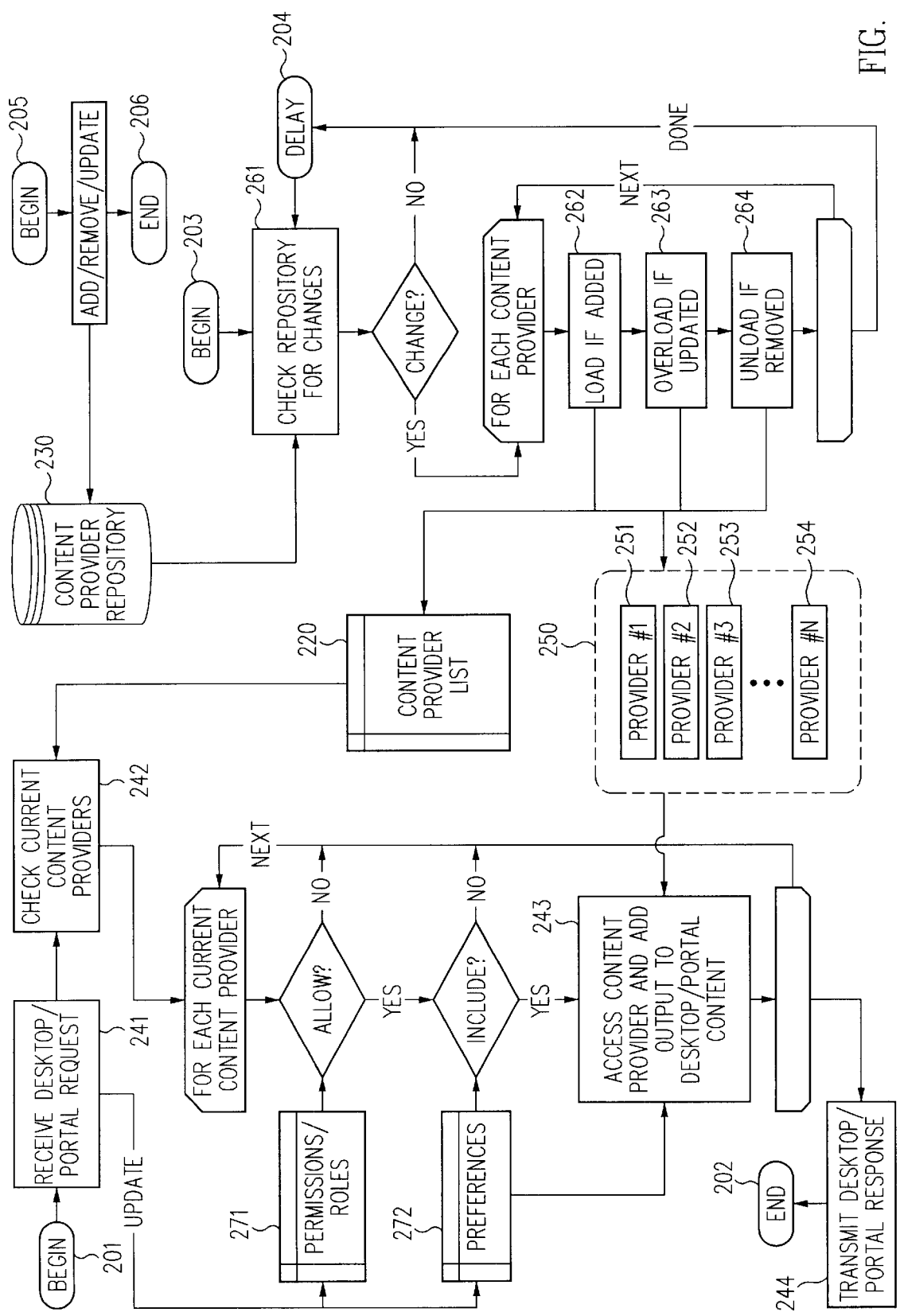
FIG. 2 is a flow chart depicting interaction of various components of a dynamic content provider management configuration in accordance with an embodiment of the present invention.

FIG. 2 illustrates a flow chart of operations in an exemplary implementation providing dynamic content in accordance with the present invention. In the flow of FIG. 2, three essentially asynchronous processes are illustrated. In particular, FIG. 2 illustrates a first process (delimited by begin 205 and end 206) by which contents of a content provider repository 230 are added to, removed from or updated. A second essentially asynchronous process is delimited by begin 203 and delay 204. This second essentially asynchronous process checks repository 230 for changes. As described above with reference to FIG. 1, such changes may include additions, removals, updates, as well as any combination of additions, removals and updates. In response to such changes, added content providers are loaded, updated content providers are overloaded and removed content providers are unloaded from a set of current content providers. In some configurations in accordance with the present invention, the current set of content providers is represented as a content provider list 220 that is accessible to a desktop or portal process which is described below. As content provider repository 230 is periodically checked for changes, the set 250 of currently available content providers (e.g., provider 251, provider 252, provider 253, . . . provider 254) changes in accordance with the set of content providers represented in repository 230. In this way, additions, removals and updates to repository 230 are dynamically reflected in a current set of providers 250 that, in some realizations is represented in content provider list 220.

Referring now to the left-hand side of FIG. 2, a desktop or portal component receives 241, are request such as for a user customized desktop. In response to the request, current provider list 220 is checked for the current set of available content providers. For each currently available content provider, permission, roles and preferences associated with the user are checked so that a proper subset of currently available content providers may be employed to generate integrated content for return to a request in client application. Note that in some configurations in accordance with the present invention, either or both of permission/roles and preference checks may be omitted. Also note that in some configurations in accordance with the present invention, preferences 272 may also affect both the presentation and organization of information supplied from content providers, as well as the set of content providers employed.

Referring to the configuration of FIG. 2, a set of dynamically loaded and dynamically instantiated content providers are employed to supply information content that is selected from organized and transmitted (244) to a client application (e.g., a browser) in response to received request 241. Note that operation of the desktop/portal component (e.g., from begin 201 to end 202) is essentially asynchronous with update of the currently available set of content providers 250, which is itself essentially asynchronous from the addition, removal and update of content provider encodings in content provider repository 230. To facilitate interactions amongst the essentially asynchronous processes or threads, locking of shared resources (e.g., of content provider repository 230, content provider list 220, and/or instantiated providers 250) will typically be employed. Although the configuration of FIG. 2 contemplates a periodic check for changes to repository 230, persons of ordinary skill in the art will appreciate a variety of suitable modifications. For example, updates to the set of currently loaded and/or instantiated content providers (e.g., set 250) may be event driven, e.g., in direct response to modifications to repository 230. Alternatively, content provider repository 230 may be checked for changes in response to operation of the desktop/portal component. For example, content provider repository 230 may be checked in response to a user request or in response to a supply of content from the current set 250 of providers, although an essentially asynchronous configuration is presently preferred for performance reasons.

Although loop constructs and particular sequences of operations are illustrated in FIG. 2, persons of ordinary skill in the art will appreciate that the particular constructs and orders of operations are not essential to achieving dynamic management of content providers and that alternate orderings and flow constructs may be employed. A variety of suitable alternative orderings and flows fall within the scope of the appended claims. Furthermore, although FIG. 2 illustrates interactions of a single process updating contents of a single content provider repository, it would be understood that multiple independent add, remove and/or update flows may operate to affect the set of content providers encoded in content provider repository 230. For example, multiple independent business organizations may separate post, remove or supply updated releases of content providers to content repository 230. Similarly, content provider repository 230 may be implemented as one or more physical stores. For example, distinct business organizations may maintain separate stores which together form a distributed implementation of content provider repository 230. In such configurations, checks (251) to the distributed content provider repository may be performed. Furthermore, although FIG. 2 illustrates a single desktop/portal implementation and a single set 250 of currently available providers, persons of ordinary skill in the art will recognize that multiple instances of each may be driven by updates to content provider repository 230. Indeed, one advantage of implementations in accordance with the present invention is the ability to drive updates to geographically distributed application servers from a single content provider repository 230.

Figure 3:
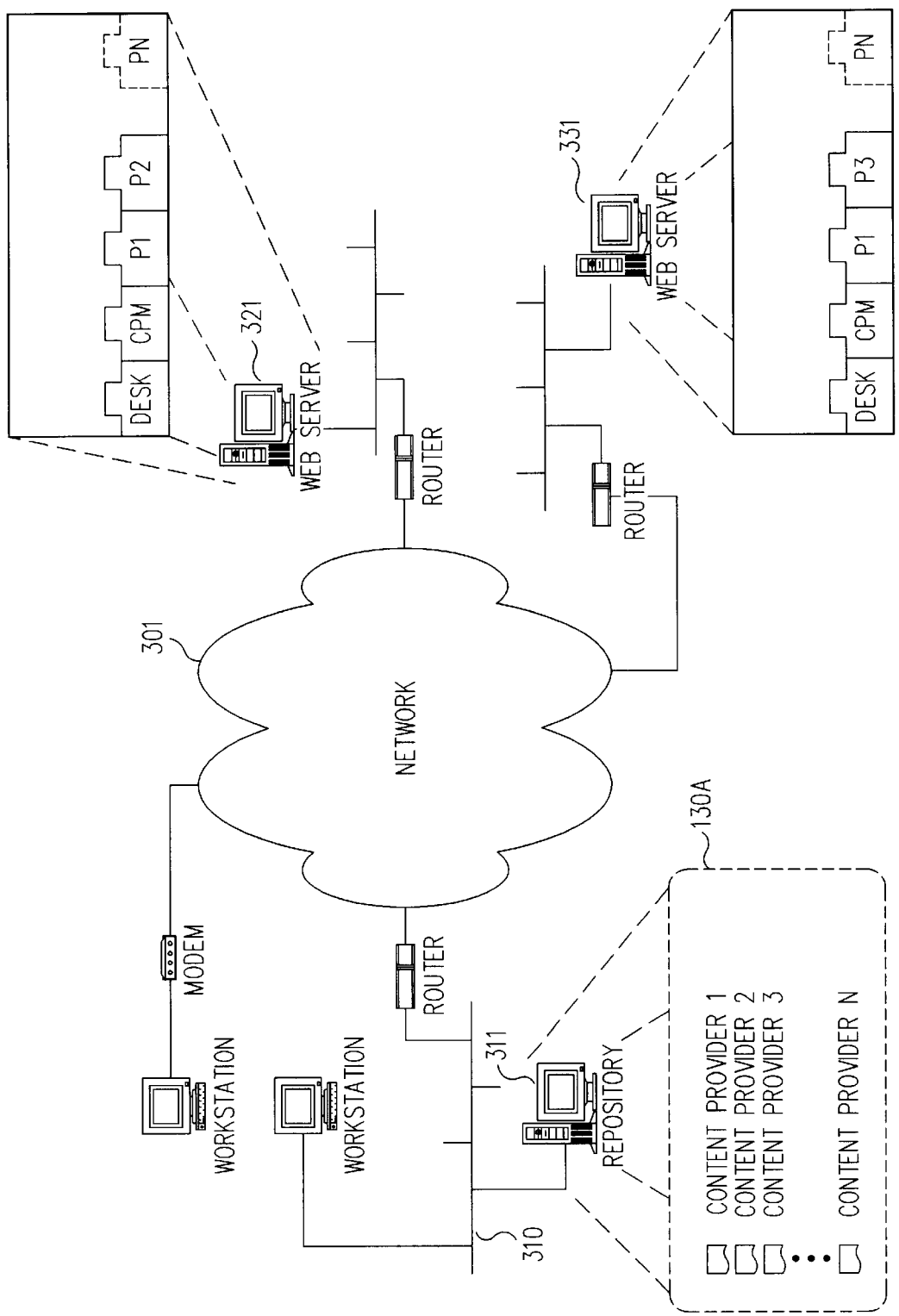
FIG. 3 is a network diagram illustrating a configuration in accordance with the present invention, wherein a dynamically updateable content provider repository allows content provided by multiple network applications to be updated.

FIG. 3 is a network diagram illustrating such a geographically distributed configuration. In the configuration of FIG. 3, a set 130A of content provider encodings is represented at a content provider repository hosted by a server 311 on network 310. Repository 130A is available over network 301, which may include a public switch telecommunications network, a private internet and/or other communications infrastructure, to geographically distributed application server implementations 321 and 331. In the configuration of FIG. 3, repository 130A encodes representations of a superset of content providers 1, 2, 3 . . . N, and the two application web servers 321 and 331 host desktop, portal or other similar applications integrating content provided by instantiated subsets of the content providers. For example, application web server 321 integrates content from content providers P1 and P2, whereas application web server 331 integrates content from content providers P1 and P3. Advantageously, by updating repository 130A with an encoding of content provider N, both application web server 321 and 331 may be dynamically updated to include, load and instantiate content provider PN, and thereby make available content associated therewith to respective client applications. Removals of content providers from repository 130A and updates to content providers encoded in repository 130A may similarly be supplied to application web servers 321 and 331 as described above with reference to FIGS. 1 and 2.

Figure 4A:
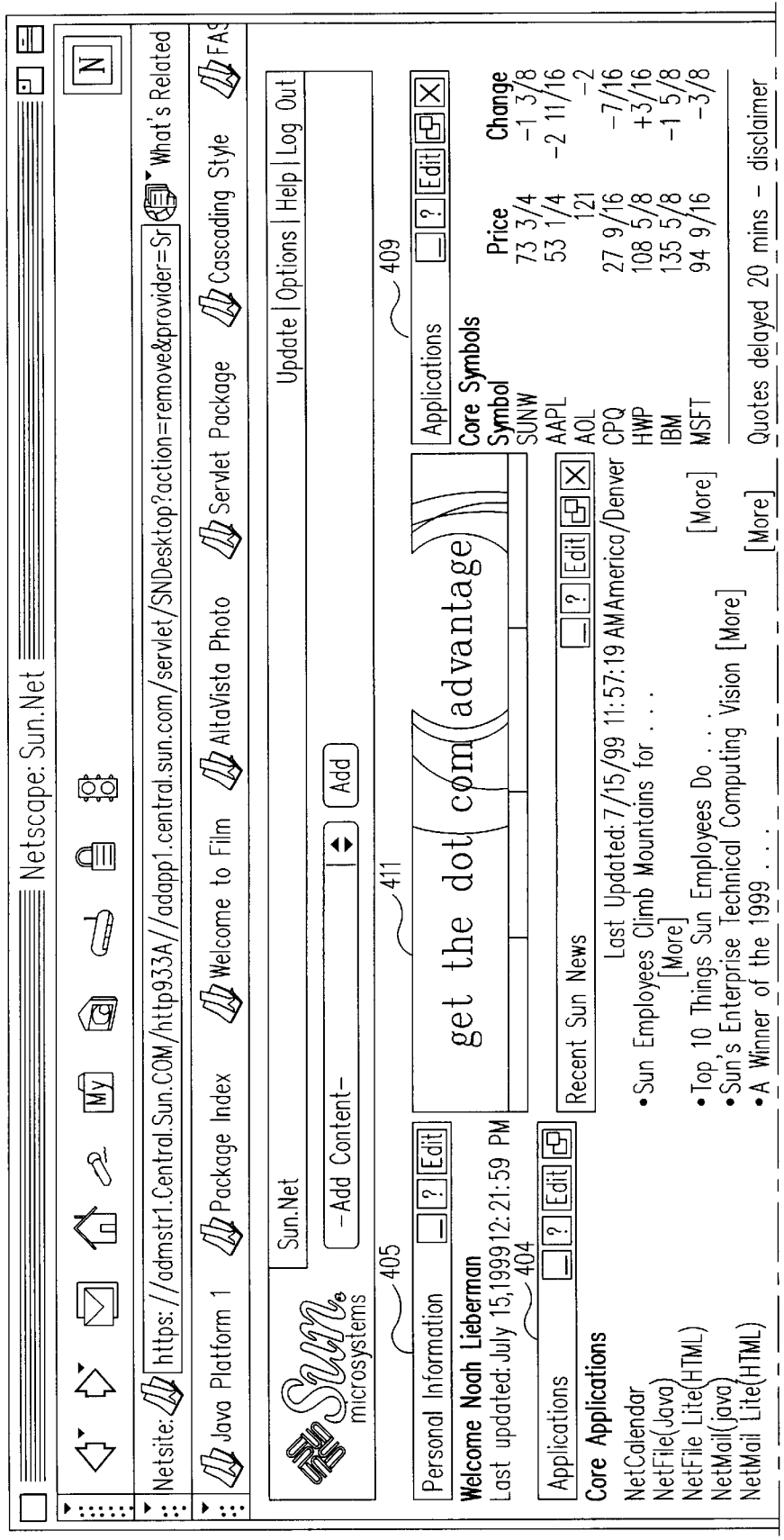
FIG. 4 illustrates a screen presentation of a web portal application integrating content from multiple content providers each dynamically updateable in accordance with an embodiment of the present invention.
Figure 4B:
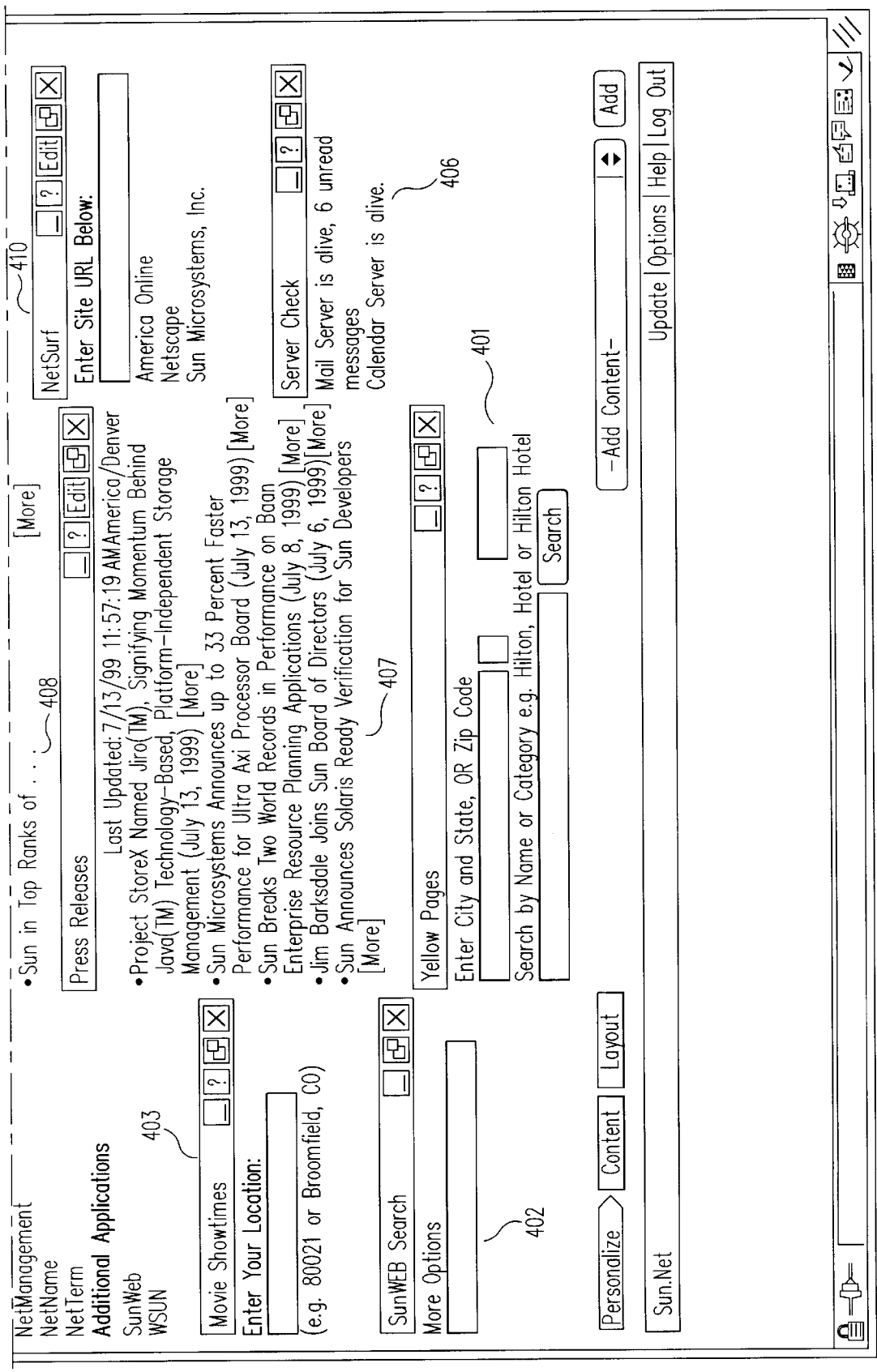

FIG. 4 illustrates a screen configuration in which multiple screen presentations corresponding to multiple backing content provider instances are arranged in accordance with user preferences. In the presentation of FIG. 4, the set of content providers made available to a user is determined in accordance with permissions and roles associated with the user. Although a wide variety of desktop, portal and other application interfaces is envisioned, the screen presentation of FIG. 4 is illustrative of several forms of content that may be supplied by backing content provider instances (e.g., providers 251, 252, 253 . . . 254) using facilities such as described above with reference to FIGS. 1 and 2.

In the screen presentation of FIG. 4, a screen presence 401 corresponds to a Yellow Pages content provider. Screen presentation 402 corresponds to a content provider implementing search facilities. Screen presentation 403 corresponds to a content provider implementing a zip code based movie show time look-up. Screen presentation 404 corresponds to a content provider implementing a launch facility for various network based applications. Screen presentation 405 corresponds to a content provider supplying user ID and user ID related information. Screen presentation 406 corresponds to a content provider supplying server status information. Screen presentation 407 corresponds to a content provider supplying press release information from one or more sources. Screen presentation 408 corresponds to a content provider supplying news headlines from one or more sources. Screen presentation 409 corresponds to a content provider supplying stock price information. Screen presentation 410 corresponds to a content provider implementing a jump to network URL facility. Finally, screen presentation 411 corresponds to a content provider supplying advertising information. Although screen presentations 401, 402, 403, 404, 405, 406, 407, 408, 409, 410 and 411 are exemplary of a wide variety of corresponding content providers that may be dynamically managed using facilities in accordance with the present invention, they are by no means exhaustive. Based on the description herein, persons of ordinary skill in the art will appreciate a wide variety of content providers and associated screen presentations that may be employed.

Using facilities described above with reference to FIGS. 1, 2 and 3, backing content provider implementations may be added, removed or updated dynamically and made available to desktop or web portal applications. In the context of FIG. 4, such dynamically variable sets of content providers may be personalized in accordance with user preferences by selecting screen locations for presenting content associated therewith. Using the facilities described above in the context of FIGS. 1, 2 and 3, content providers may be added to the set available for inclusion in a user's personalized desktop without interrupting and/or restarting the desktop or web portal service with which the user interacts. In addition, the addition or update of a particular component, for example, a stock portfolio content provider component corresponding to screen presentation 409 may be added or updated to multiple desktop or portal implementations distributed throughout the world, throughout an organization, etc. by updating a single content provider repository. As desktops and portal applications attempt to integrate content from a wide variety of sources and vendors, the dynamically pluggable aspects of implementations in accordance with the present invention provide a substantial advantage by decoupling the addition, removal and/or update of content provider components from the desktop or portal implementation. Content provider implementations may be updated or added all without interrupting operation of a desktop or portal implementation.

Exemplary Implementations

In an exemplary embodiment, at least some of the above-described components are implemented as servlets executable in the context of a commercially-available web server environment. For example, the Netscape Enterprise Server architecture with extensions for certificate handling, HyperText Transfer Protocol (HTTP), Secure Sockets Layer (SSL) support, and Java™ Servlet Support available from Netscape Communications Corporation and Sun Microsystems, Inc. is one suitable environment. Netscape is a registered trademark of Netscape Communications Corporation in the United States and other countries. Java and all Java-based marks and logos are trademarks or registered trademarks of Sun Microsystems, Inc. in the United States and other countries. While the description herein is focused on aspects of a dynamically managed set of content providers, rather than on peculiarities of a particular implementation environment, it is envisioned that implementations in accordance with the teachings of the present invention may be implemented in the context of many commercially-available networked information service environments, including web server environments, as well as in custom environments and environments that in the future will be developed. However, to facilitate an understanding of broad concepts using a specific exemplary environment, and without limitation, the description herein may include terminology specific to web servers and a Netscape Enterprise Server architecture thereof. Nonetheless, based on this description, persons of ordinary skill in the art will appreciate implementations suitable for other environments. The scope of the invention, as defined by the claims that follow, is not limited to any specific implementation environment.

While the invention has been described with reference to various embodiments, it will be understood that these embodiments are illustrative and that the scope of the invention is not limited to them. Many variations, modifications, additions, and improvements are possible. For example, although object-oriented terminology is used to describe exemplary realizations (and in some cases, Java programming language constructs are used to facilitate descriptions), embodiments need not employ object-oriented technology (or Java technology). Although web desktop and portal applications have been described, embodiments in accordance with the invention are not limited thereto. Similarly, particular encodings of content provider representations and structures of uniform content provider interface definitions are merely exemplary.

More generally, plural instances may be provided for components described herein as a single instance. Finally, boundaries between various components, services, servlets, and data stores are somewhat arbitrary, and particular operations are illustrated in the context of specific illustrative configurations. Other allocations of functionality are envisioned and may fall within the scope of claims that follow. Structures and functionality presented as discrete components in the exemplary configurations may be implemented as a combined structure or component. These and other variations, modifications, additions, and improvements may fall within the scope of the invention as defined in the claims that follow.

What is claimed is:

1. A method of modifying content served by a networked information service, the method comprising:

instantiating a set of one or more content provider classes, the set of instantiated content providers based on encoded representations thereof in a content provider directory;

(a) supplying a client application with content corresponding to the instantiated content providers;

updating the set of instantiated content providers without interruption of the networked information service, the updated set of instantiated content providers based on changes to content provider directory; and thereafter (b) supplying the client application with content corresponding to the updated set of instantiated content providers.

2. A method as in claim 1,
wherein the (a) and the (b) supplyings include content supplied by then instantiated content providers responsive to requests from the client application.

3. A method as in claim 1,
wherein the client application includes a browser; and
wherein the (a) and the (b) supplyings include content supplied by then instantiated content providers and organized in accordance with user preferences as at least one page for display by the browser.

4. A method as in claim 1, wherein the updating includes:
for each new content provider,
 instantiating a corresponding new class; and
 adding the corresponding instantiated class to a list of content providers available to the networked information service; and
for each removed content provider,
 destroying a corresponding previously instantiated class; and
 removing the corresponding previously instantiated class from the list of content providers available to the networked information service.

5. A method as in claim 4, wherein the updating includes:
for each modified content provider,
 destroying a corresponding previously instantiated class; and
 re-instantiating a corresponding new class.

6. A method as in claim 1, further comprising:
periodically examining the content provider directory for a change to the content providers encoded therein.

7. A method as in claim 1,
wherein the content providers are encoded as compressed archives of implementing classes and markup language templates;
wherein the updating includes expanding each new compressed archive and instantiating the implementing classes encoded therein; and
wherein the (b) supplying includes organizing presentation of content to the client application in accordance with corresponding ones of the markup language templates.

8. A method as in claim 1, further comprising:
selecting subsets of the instantiated content providers for the (a) and the (b) supplying to the client application based on a corresponding user's access limitations and preferences.

9. A method of updating content served by an information resource without interrupting operation thereof, the method comprising:

instantiating in accordance with a content repository, a set of software objects implementing respective content sources;

adding to, and removing from, the set of instantiated software objects in correspondence with additions to, and deletions from, the content repository, the instantiated software objects executable by the information resource without recompilation of the information resource and without a service interrupting restart thereof;

in response to a request from a client application,
 selecting for execution those of the set of software objects consistent with associated user parameters;
 executing the selected software objects; and
 supplying the client application with content sourced from the selected software objects.

10. A method as in claim 9,
wherein the client application includes a web browser;
wherein the information resource includes a web portal; and
wherein the content supplying includes organizing content from the selected software objects and supplying the organized content to the web browser as a web page.

11. A method as in claim 9, further comprising:
adding to, and deleting from, the content repository.

12. A method as in claim 9,
wherein the content repository includes a file system directory.

13. A method as in claim 9,
wherein the content repository includes a data store physically separated from the information resource but accessible via a communications network.

14. A method as in claim 9,
wherein the content repository encodes instantiable representations of the software objects.

15. A method as in claim 9,
wherein the content repository is shared amongst the information resource and a second information resource.

16. A method as in claim 15,
wherein at least two of the content repository, the information resource and the second information resource are physically dispersed.

17. A method as in claim 9,
wherein the user parameters include permissions and preferences particular to a user.

18. A method as in claim 9, further comprising:
periodically checking the content repository for changes thereto; and
performing the adding to, and removing from, in response to a content repository change detected during the periodic checking.

19. A method of providing a dynamically variable set of content instances in an information resource environment, the method comprising:

predefining at least one repository for encoding one or more content instances of the set of content instances;

responsive to addition to the set of content instances of an encoding for a first content instance, instantiating the first content instance within the information resource environment without interruption thereof; and thereafter, presenting the first content instance as part of the information resource environment.

20. A method as in claim 19, further comprising:

periodically checking the at least one repository for the addition.

21. A method as in claim 19, wherein the instantiating without interruption is without information resource environment recompilation and without a service interrupting restart of the information resource environment.

22. A method as in claim 19, further comprising:

responsive to removal from the set of content instances of an encoding for a second content instance, dissociating the second content instance from the information resource environment without interruption thereof; and thereafter, presenting the information resource environment without the second content instance.

23. A method as in claim 19, further comprising:

responsive to modification of an encoding for a third content instance, reinstantiating the third instance within the information resource environment based on the modified encoding, the reinstantiating being without interruption of the information resource environment; and thereafter, presenting a modified third content instance as part of the information resource environment.

24. A method as in claim 19, wherein the information resource environment includes a network service for selecting from the set of content instances and presenting selected content in accordance with a desktop paradigm; and wherein the selecting is in accordance with a particular user's access limitations and preferences.

25. A method as in claim 19, wherein the repository includes a file system directory; and wherein the one or more content instances are encoded as one or more content provider archive files in the file system directory.

26. A method as in claim 19, wherein the information resource environment includes a desktop service executing on a web server; and wherein the desktop service supplies a client browser with a customized set of content providers.

27. A networked information system comprising:

a content manager service responsive to client requests for access to content providers, the content manager instantiating a set of the content providers encoded in a repository therefor; and means for updating the set of instantiated content providers in correspondence with changes in the repository and without interrupting client request servicing by the content manager.

28. A computer program product encoded in at least one computer readable medium, the computer program product comprising:

content provider manager code executable on one or more computers as a content provider manager service to maintain a time-varying set of instantiated content provider objects in correspondence with a content provider repository; and information service code executable to service incoming requests for information content, the interface code servicing the incoming requests with information content from the time-varying set of instantiated content provider objects, wherein changes to the time-varying set of instantiated content provider objects are supported without a service interrupting recompilation or restart of the information service code.

29. A computer program product as recited in claim 28, further comprising:

at least one instantiable encoding of a content provider object.

30. A computer program product as recited in claim 28, wherein the information service code implements a web portal service;

wherein the incoming requests are from web browsers; and wherein the content provider manager service manages pluggable content for the web portal service.

31. A computer program product as recited in claim 28, wherein the information service code implements a desktop service; and wherein the content provider manager service manages pluggable content therefor.

32. A computer program product as recited in claim 28, wherein the at least one computer readable medium is selected from the set of a disk, tape or other magnetic, optical, or electronic storage medium and a network, wireline, wireless or other communications medium.

* * * * *